United States Patent
Chow et al.

(10) Patent No.: US 7,072,351 B1
(45) Date of Patent: Jul. 4, 2006

(54) COLLISION RECOVERY INTERFACE SUPPORT IN A HOME PHONELINE NETWORKING ALLIANCE MEDIA ACCESS CONTROLLER (HPNA MAC) OPERATING IN ACCORDANCE WITH AT LEAST TWO DIFFERENT DATA RATE STANDARDS

(75) Inventors: Peter K. Chow, San Jose, CA (US);
Jenny L. Fischer, Mt. View, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 910 days.

(21) Appl. No.: 09/893,100

(22) Filed: Jun. 26, 2001

(51) Int. Cl.
*H04L 12/28* (2006.01)

(52) U.S. Cl. .................. 370/419; 370/447; 370/463

(58) Field of Classification Search ............... 370/352, 370/389, 445, 447, 448, 419
See application file for complete search history.

(56) References Cited

U.S. PATENT DOCUMENTS 5,991,303 A * 11/1999 Mills .......................... 370/402
6,256,317 B1 * 7/2001 Holloway et al. ............ 370/447
6,269,104 B1 * 7/2001 McLaughlin et al. ........ 370/464
6,839,345 B1 * 1/2005 Lu et al. ..................... 370/365
2002/0057717 A1 * 5/2002 Mallory ...................... 370/503
2003/0101459 A1 * 5/2003 Edson ......................... 725/82

OTHER PUBLICATIONS

Stallings, Data & computer communications, Nov. 1999, Pearson Education, six edition, Chapter 4 and 13.*

* cited by examiner

*Primary Examiner*—Chau Nguyen
*Assistant Examiner*—Ian N. Moore
(74) *Attorney, Agent, or Firm*—Winstead Sechrest & Minick P.C.

(57) ABSTRACT

Aspects for collision recovery interface support in a home phoneline networking alliance (HPNA) control chip are described. The aspects include providing transmit data path logic to receive and transmit data packets within the HPNA control chip. The transmit data path logic is consolidated to include a transmit state machine that handles interfacing the transmit data path logic to at least two separate collision recovery logic means of the HPNA control chip through a minimal number of generic interface signals.

18 Claims, 3 Drawing Sheets

COLLISION RECOVERY INTERFACE SUPPORT IN A HOME PHONELINE NETWORKING ALLIANCE MEDIA ACCESS CONTROLLER (HPNA MAC) OPERATING IN ACCORDANCE WITH AT LEAST TWO DIFFERENT DATA RATE STANDARDS

FIELD OF THE INVENTION

The present invention relates to home phoneline networking alliance (HPNA) networks, and more particularly to collision recovery interface support in an HPNA environment capable of operating at different data rates.

BACKGROUND OF THE INVENTION

As the personal computer (PC) has become more prevalent as a mass consumer item, many people have multiple PCs in their houses. With multiple PCs, it becomes desirable to network the computer together for communication with each other. Having the computers connected in a network allows many advantages, such as the ability to share a single printer between computers and use a single Internet connection.

A networking approach that utilizes phone lines within a home has been developed based on the specifications of the Home Phoneline Networking Alliance (HPNA) to achieve such communication among multiple computers within a home environment. The HomePNA, as it is commonly called, is regarded generally as easy to install, inexpensive and fast, without requiring any additional wiring, since the phone lines already present in the home are used. HomePNA operates using a method known as Frequency Division Multiplexing (FDM), which allows voice and data to travel on the same wires without interfering with each other, since a standard phone line has enough room to support voice, a high-speed DSL modem, and a home phone line network.

The original version of the HPNA standard, HPNA 1.0, operated at a 1 Mbps (megabits per second). The current specification, HPNA 2.0, is based on technology that operates at a faster 10 Mbps. In order to support both standards in a single device requires some special considerations.

For example, separate collision resolution is required for supporting each standard. Although separate, the logic for each must interface with the transmit data path. Accordingly, a need exists for determining a manner to provide the necessary interface support for the separate logic without having separate interface logic control. The present invention addresses such a need.

SUMMARY OF THE INVENTION

Aspects for collision recovery interface support in a home phoneline networking alliance (HPNA) control chip are described. The aspects include providing transmit data path logic to receive and transmit data packets within the HPNA control chip. The transmit data path logic is consolidated to include a transmit state machine that handles interfacing the transmit data path logic to at least two separate collision recovery logic means of the HPNA control chip through a minimal number of generic interface signals.

With the present invention, the transmit data path architecture is arranged to allow a single interface to be utilized successfully between the transmit data path and separate collision recovery mechanisms within a MAC. The straightforward approach of the present invention is further recognized through the implementation with a generic and relatively small number of interface signals. Further, the use of a single interface element avoids the cumbersome and expensive duplication of design elements for the transmit data path to accommodate the differing collision recovery elements. These and other advantages of the aspects of the present invention will be more fully understood in the following detailed description in conjunction with the accompanying drawings.

DETAILED DESCRIPTION OF THE INVENTION

The present invention relates to collision recovery interface support in an HPNA environment capable of operating at different data rates. The following description is presented to enable one of ordinary skill in the art to make and use the invention and is provided in the context of a patent application and its requirements. Thus, the present invention is not intended to be limited to the embodiment shown but is to be accorded the widest scope consistent with the principles and features described herein.

Figure 1:
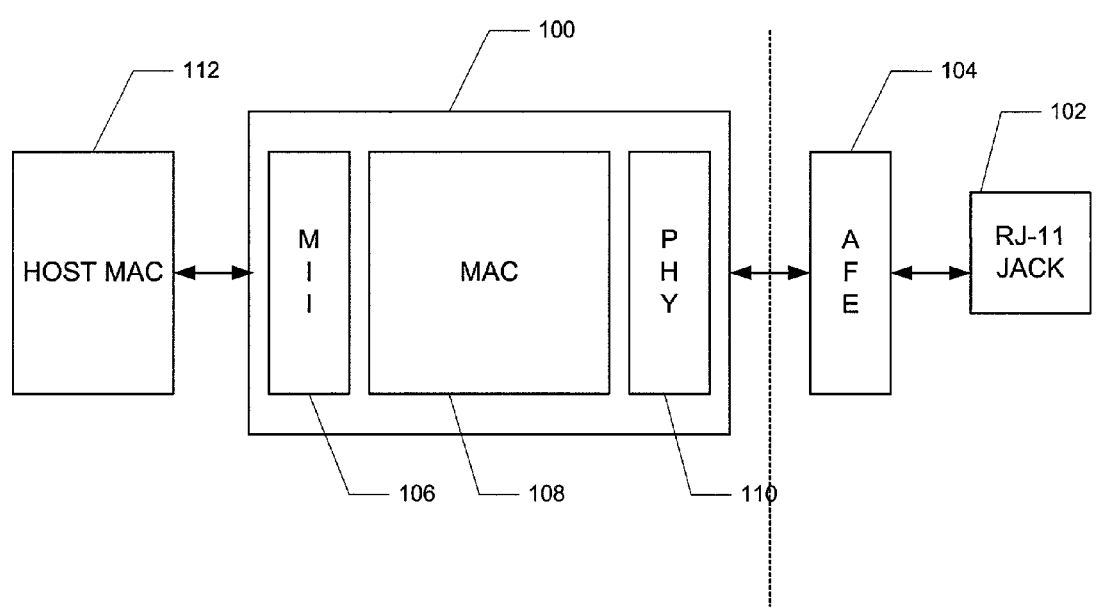
FIG. 1 illustrates a preferred embodiment of a home phone line network in accordance with the present invention.
Figure 2:
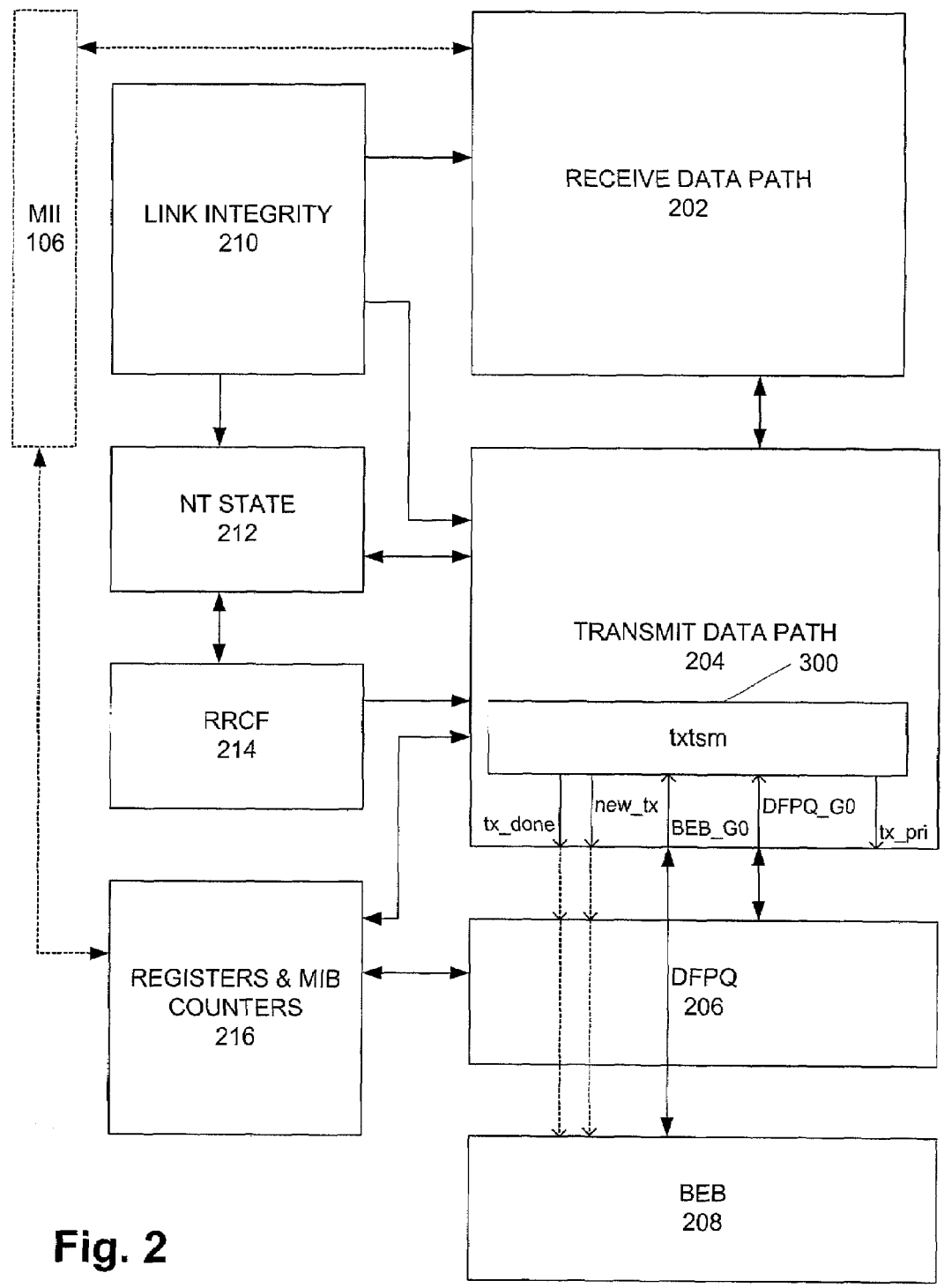
FIG. 2 illustrates a block diagram of operational elements of a preferred embodiment of the MAC 108 in accordance with the present invention.

FIG. 1 illustrates a preferred embodiment of a home phone line network in accordance with the present invention. The preferred embodiment of the network complies with the Home Phoneline Networking Alliance (HPNA) specification version 2.0. The network allows multiple computers to communicate through telephone wires typically installed in residential homes. The network comprises a control chip 100. The chip 100 further comprises a Media Independent Interface (MII) 106, a Media Access Control (MAC) 108, and a Physical Layer (PHY) 110. The chip 100 implements the HPNA 2.0 specification. The chip 100 receives a signal containing data packets through the telephone wires via a phone jack 102. There is an analog front end (AFE) 104 which processes the signal between the chip 100 and the telephone wires. The chip 100 then processes the packets received in the signal from the AFE 104, and outputs a signal to the Host MAC 112. FIG. 2 illustrates a block diagram of operational elements of a preferred embodiment of the MAC 108 in accordance with the present invention. As shown, the MAC 108 includes a Receive Data Path 202, a Transmit Data Path 204, a Distributed Fair Priority Queuing (DFPQ) 206, a Binary Exponential Backoff (BEB) 208, a Link Integrity 210, a Network State 212, a Rate Request Control Frame (RRCF) 214, and a plurality of registers and Management Information Base (MIB) counters 216.

The Receive Data Path 202 receives data packets from the PHY 110 and sends data packets to the MII 106. In the preferred embodiment, after each data packet sent by the Receive Data Path 202, another packet, referred to herein as a "frame status frame", is sent immediately following. The frame status frame contains certain status information required by subsequent processes.

The Transmit Data Path 204, which receives data packets from the MII 106 and transmits them to the PHY 110.

The DFPQ 206 and the BEB 208 provide collision resolution. The HPNA 2.0 specification supports both a 10 megabit per second (mbps) data rate and a 1 mbps data rate. The DFPQ 206 provides collision resolution for the 10 mbps data rate, while the BEB 208 provides collision resolution for the 1 mbps data rate. In the preferred embodiment, the PHY 110 will provide a collision detect signal. Either the DFPQ 206 or the BEB 208 will then attempt to resolve the collision.

The Link Integrity 210 monitors the physical network conditions. In the preferred embodiment, the Link Integrity 210 updates a link status bit in a link register. The Link Integrity 210 also sends link packets in accordance with the HPNA 2.0 specification. The Network State 212 monitors the current mode of the MAC 108, i.e., whether the MAC 108 is operating in the 10 mbps data rate mode ("10M8") or the 1 mbps data rate mode ("1M8").

The RRCF 214 issues a RRCF signal whenever the MAC 108 transitions between data rates. The RRCF is used to perform the rate negotiation function, i.e., to determine what is the data rate to communicate between different stations in a home phone line network.

The registers and MIB counters 216 provide programmability to the MAC 108 and handle error event counting.

In performing the operations necessary for transmitting data, the Transmit Data Path 204 includes functionality for a data sequencer, LICF (Link Integrity Control Frame) and RRCF sequencer, CRC generator, and nibbler. In accordance with the present invention, the Transmit Data Path 204 further includes a transmit state machine 300. The transmit state machine 300 capably handles the interface with both collision recovery sections of the MAC 108 in a straightforward manner through a minimal number of generic interface signals. Through these signals, the transmit state machine (txstm) 300 informs both the DFPQ 206 and BEB 208 of a new frame (new_tx) and whether the transmit is done (tx_done). The collision resolution blocks 206 and 208 provide signals DFPQ_GO or BEB_GO, respectively, to indicate their preparedness for transmit. The tx_pri represents the part of the data itself that indicates what priority type the transmission is. The tx_pri data is provided only for DFPQ 206 as it implements priority access.

Figure 3:
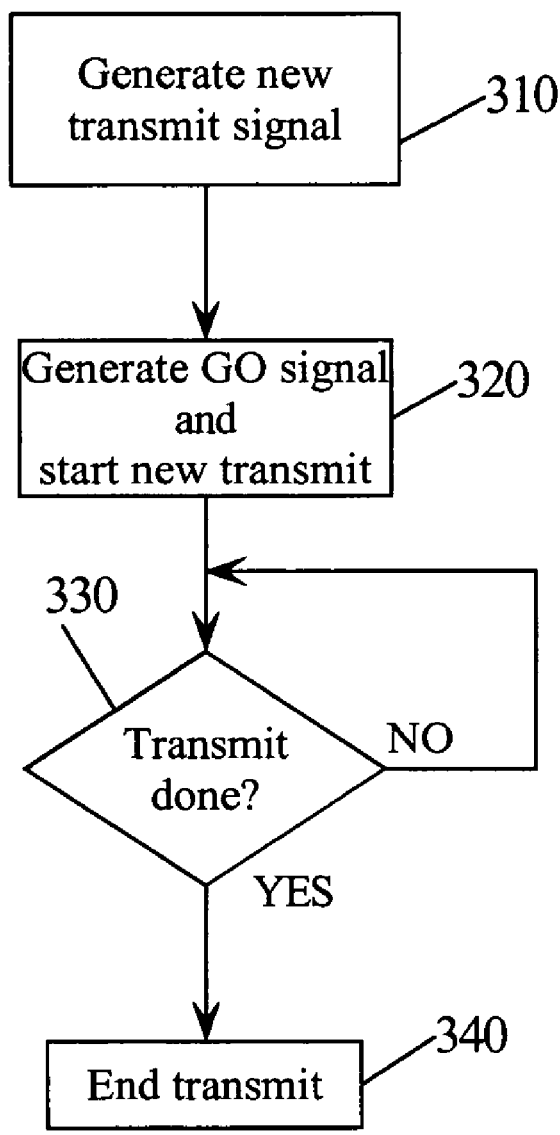
FIG. 3 illustrates a block flow diagram for a transmit state machine in accordance with the present invention.

FIG. 3 illustrates a block flow diagram of the states of the txstm 300 for its interfacing with the separate collision resolution logic. The txstm 300 detects when transmission is ready in the Transmit Data Path 204 by detecting when a transmit active signal occurs, and arbitrating among LICF, RRCF, and TXD grant and request. Once transmit is ready, the txstm 300 transmits a new_tx signal, as well as passing through the tx_pri indication for the DFPQ (step 310). The collision resolution blocks (BEB 208 and DFPQ 206) will then generate the GO signal (BEB_GO or DFPQ_GO) to signal start of a new transmission (step 320). This starts the reading of the data from the MII 106 to store in TX_FIFO. The txstm 300 then waits for the transmission to be done, either by the completion of the transmit, e.g., by looking for CRS to drop for transmit done, or the exceeding of a retry limit for transmissions with detected collisions (step 330). The transmit is then ended (step 340) as indicated through the signaling of the tx_done signal.

With the present invention, the transmit data path architecture is arranged to allow a single interface to be utilized successfully between the transmit data path and separate collision recovery mechanisms within a MAC. The straightforward approach of the present invention is further recognized through the implementation with a generic and relatively small number of interface signals. Further, the use of a single interface element avoids the cumbersome and expensive duplication of design elements for the transmit data path to accommodate the differing collision recovery elements.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for collision recovery interface support in a home phoneline networking alliance (HPNA) control chip, the method comprising the steps:
   (a) providing transmit data path logic to receive and transmit data packets within the HPNA control chip; and
   (b) consolidating the transmit data path logic to include a transmit state machine that handles interfacing the transmit data path logic to at least two separate collision recovery logic means of the HPNA control chip through a minimal number of generic interface signals.

2. The method of claim 1 wherein the minimal number of interface signals further comprises a GO signal from each separate collision recovery logic means.

3. The method of claim 2 wherein the minimal number of interface signals further comprises a new transmit signal.

4. The method of claim 3 wherein the minimal number of interface signals further comprises a transmit done signal.

5. The method of claim 4 wherein the minimal number of interface signals further comprises a transmit priority indicator from the transmit data.

6. The method of claim 1 wherein the at least two separate collision recovery logic means further comprises a BEB collision recovery means.

7. The method of claim 6 wherein the at least two separate collision recovery logic means further comprises a DFPQ collision recovery means.

8. A system for collision recovery interface support in a home phoneline networking alliance (HPNA) control chip, the system comprising:
   at least two collision recovery means for providing collision recovery in the HPNA control chip according to at least two data rate standards; and
   a transmit data path logic means including a transmit state machine that interfaces with the at least two collision recovery means through a minimal number of generic interface signals.

9. The system of claim 8 wherein the minimal number of interface signals further comprises a GO signal from each collision recovery means.

10. The system of claim 9 wherein the minimal number of interface signals further comprises a new transmit signal.

11. The system of claim 10 wherein the minimal number of interface signals further comprises a transmit done signal.

12. The system of claim 11 wherein the minimal number of interface signals further comprises a transmit priority indicator from the transmit data.

13. The system of claim 8 wherein the at least two collision recovery means further comprises a BEB collision recovery means.

14. The system of claim 13 wherein the at least two collision recovery means further comprises a DFPQ collision recovery means.

15. A home phone networking alliance (HPNA) network control chip capable of collision recovery interface support, the chip comprising:
- a media independent interface (MII);
- a physical layer (PHY); and
- a media access control (MAC) coupled between the MII and the PHY, the MAC further comprising at least two collision recovery means for providing collision recovery according to at least two data rate standards, and a transmit data path logic means including a transmit state machine that interfaces with the at least two collision recovery means through a minimal number of generic interface signals.

16. The method of claim 15 wherein the minimal number of interface signals further comprises a GO signal from each collision recovery means, a new transmit signal, a transmit done signal, and a transmit priority indicator from the transmit data.

17. The method of claim 15 wherein the at least two collision recovery means further comprises a BEB collision recovery means.

18. The method of claim 17 wherein the at least two collision recovery means further comprises a DFPQ collision recovery means.

* * * * *